US012687110B2

(12) United States Patent　　　　　(10) Patent No.:　US 12,687,110 B2
Elkhoury et al.　　　　　　　　　　　 (45) Date of Patent:　　　Jul. 21, 2026

(54) SYSTEMS AND METHODS FOR MEASUREMENT OF FORMATION ELASTIC MODULI WITH A BOREHOLE DUAL PACKER APPARATUS

(71) Applicant: Schlumberger Technology Corporation, Sugar Land, TX (US)

(72) Inventors: Jean Elkhoury, Cambridge, MA (US); Richard A. Birchwood, Cambridge, MA (US); Romain Prioul, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/217,921

(22) Filed: May 23, 2025

(65) Prior Publication Data

US 2026/0009330 A1　　　Jan. 8, 2026

Related U.S. Application Data

(60) Provisional application No. 63/651,624, filed on May 24, 2024.

(51) Int. Cl.
　　*E21B 49/08*　　　　　(2006.01)
　　*E21B 47/06*　　　　　(2012.01)
　　*G01V 9/00*　　　　　(2006.01)
(52) U.S. Cl.
　　CPC .......... *E21B 49/0875* (2020.05); *E21B 47/06* (2013.01); *G01V 9/00* (2013.01)
(58) Field of Classification Search
　　CPC ................................. E21B 49/08; E21B 47/06
　　See application file for complete search history.

(56) References Cited

U.S. PATENT DOCUMENTS

| | | | |
|---|---|---|---|
| 11,933,776 B2 | 3/2024 | Elkhoury | |
| 12,037,898 B2 | 7/2024 | De Gennaro | |
| 2005/0028974 A1* | 2/2005 | Moody | E21B 49/081 |
| | | | 166/57 |
| 2009/0165548 A1* | 7/2009 | Pop | E21B 49/008 |
| | | | 73/152.51 |
| 2012/0043077 A1* | 2/2012 | Edwards | E21B 43/26 |
| | | | 166/250.1 |
| 2019/0368351 A1* | 12/2019 | Yuratich | E21B 49/10 |
| 2020/0011787 A1* | 1/2020 | Dalby | G01N 33/2823 |
| 2022/0178251 A1 | 6/2022 | De Gennaro | |
| 2022/0196629 A1* | 6/2022 | Elkhoury | G01N 19/00 |
| 2025/0264021 A1 | 8/2025 | Birchwood | |

OTHER PUBLICATIONS

Elkhoury, E. J. et al., "Laboratory investigation of static elastic properties assessment with pressuremeter testing", American Rock Mechanics Association, 2021, 6 pages.

Elkhoury, E. J. et al., "The First Pressuremeter Testing Campaign on Wireline Formation Testers in Deep Boreholes", American Rock Mechanics Association, 2022, 13 pages.

* cited by examiner

*Primary Examiner* — Giovanna Wright
(74) *Attorney, Agent, or Firm* — Kyle R. Miiller

(57)　　　　　　ABSTRACT

A method including deploying a formation testing tool in a borehole, actuating first and second packers of the formation testing tool in the borehole, obtaining measurements in response to actuation of the first and second packers of the formation testing tool in the borehole, and analyzing the measurements to estimate at least a shear modulus (G) of a geological formation surrounding the borehole.

20 Claims, 7 Drawing Sheets

1

SYSTEMS AND METHODS FOR MEASUREMENT OF FORMATION ELASTIC MODULI WITH A BOREHOLE DUAL PACKER APPARATUS

CROSS-REFERENCE TO RELATED APPLICATION

The present application is a U.S. Non-Provisional Patent application claiming benefit of U.S. Provisional Patent Application No. 63/651,624, entitled "METHOD FOR MEASURING FORMATION ELASTIC MODULI", filed May 24, 2024, which is hereby incorporated by reference in its entirety for all purposes.

BACKGROUND

The present disclosure relates generally to systems and methods for measurement of a formation elastic moduli with a borehole dual packer apparatus.

The static shear modulus, G, is a regularly utilized parameter in geomechanics. In conjunction with either the Young Modulus, E, or the Poisson Ratio, v, G governs the elastic behavior of materials in general, and geomaterials, in particular. Elastic properties are crucial formation characteristics for nuclear waste storage, $CO_2$ geologic storage, and subsurface gas storage. Elastic properties are also crucial for planning and executing many field-scale operations in the oil and gas industry, such as maintaining wellbore stability, designing hydraulic fracturing operations, managing reservoir production, and quantifying the integrity of faults and reservoir caprocks.

One proven approach to determine the in situ static shear modulus, G, is by employing the pressuremeter testing (PMT) technique. The PMT consists of inflating and deflating a single packer downhole while measuring the pressure exerted on the borehole wall and the volume of fluid injected into the packer. PMT has been performed using a single packer configuration, deployed on a stand-alone tool or as part of a formation testing tool. In the latter case, a dual packer module may be deployed for fluid sampling, formation stress testing or other purposes. In order to maintain the resolution of a single packer configuration when conducting the PMT, one of the two packers of the dual packer module may be removed or isolated from injected fluids. This also increases the fraction of the injected fluid volume that contributes to expansion of the borehole wall, rather than deforming components of the PMT tool. Estimation of the fraction of the injected fluid volume that contributes to expansion of the borehole wall may be achieved by inflating the packer in a well-known formation or a casing to estimate tool mechanical stiffness and then removing the effect of this stiffness from the measured elastic properties of the formation. There may be cases in which it may be desirable to conduct a PMT using a dual packer tool. In such cases it might not be feasible to modify the dual packer tool or run a dedicated single-packer tool. As such, new methods for determining the in situ static shear modulus, G, may be desirable.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In certain embodiments, a method including deploying a formation testing tool in a borehole, actuating first and second packers of the formation testing tool in the borehole, obtaining measurements in response to actuation of the first and second packers of the formation testing tool in the borehole, and analyzing the measurements to estimate at least a shear modulus (G) of a geological formation surrounding the borehole.

In certain embodiments, a tangible and non-transitory machine readable medium including instructions executable by one or more processors to perform operations including controlling deployment of a formation testing tool in a borehole, controlling actuation of first and second packers of the formation testing tool in the borehole, obtaining measurements in response to actuation of the first and second packers of the formation testing tool in the borehole, and analyzing the measurements to estimate at least a shear modulus (G) of a geological formation surrounding the borehole.

In certain embodiments, a system including a formation testing tool is configured to deploy in a borehole. The formation testing tool includes a first packer, a second packer, a fluid supply configured to supply a fluid to cause an actuation of the first and second packers, at least one pressure sensor configured to monitor pressure during the actuation of the first and second packers, at least one fluid volume sensor configured to monitor a fluid volume during the actuation of the first and second packers, a controller having a memory, a processor, and instructions stored on the memory and executable by the processor to obtain measurements from the at least one pressure sensor and the at least one fluid volume sensor in response to the actuation of the first and second packers of the formation testing tool in the borehole, and analyze the measurements to estimate at least a shear modulus (G) of a geological formation surrounding the borehole.

DRAWINGS

These and other features, aspects, and advantages of the present disclosure will become better understood when the following detailed description is read with reference to the accompanying drawings in which like characters represent like parts throughout the drawings, wherein.

Figure 1:
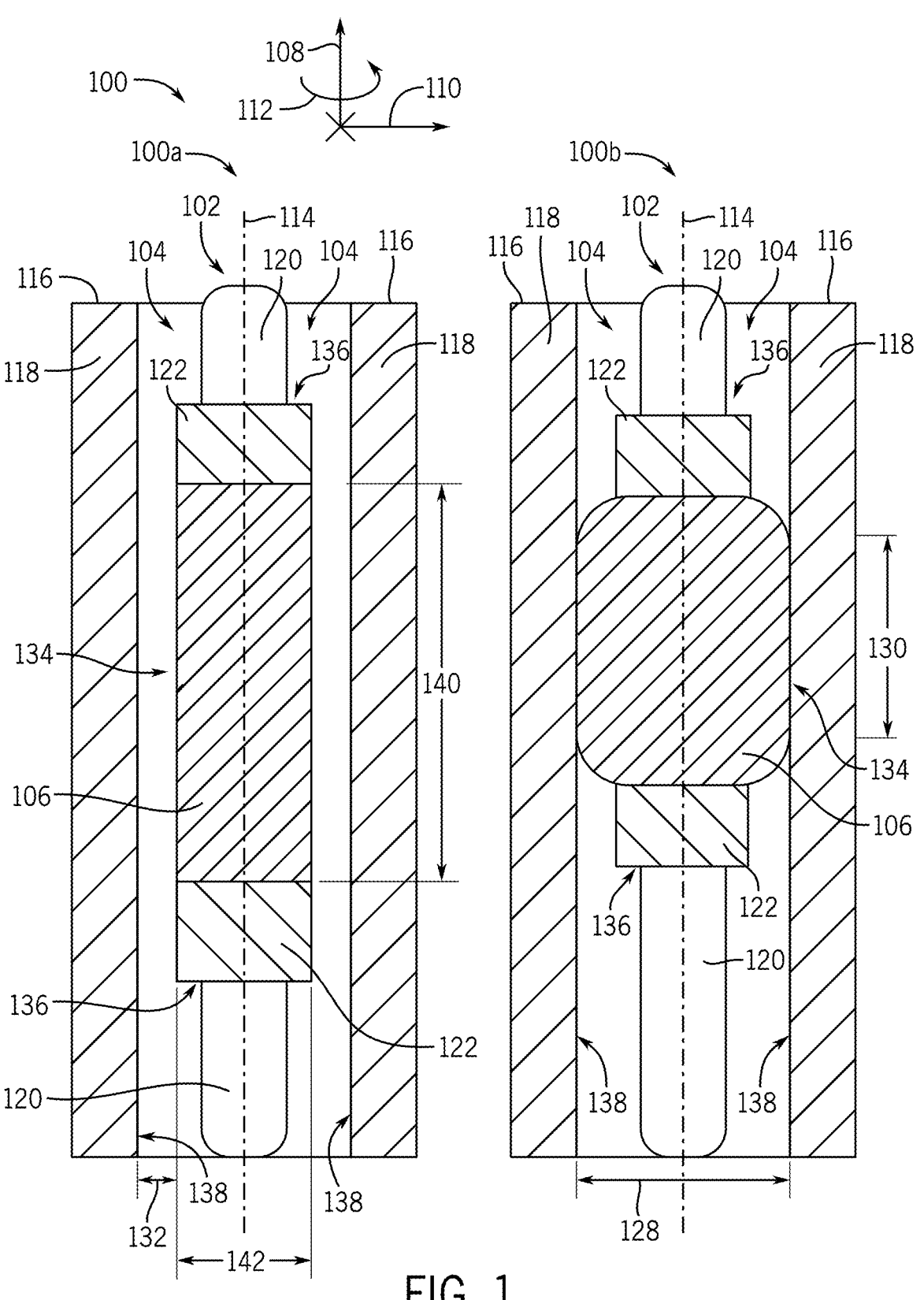
FIG. 1 is a schematic of an embodiment of a wireline formation tester (WFT) tool in a borehole, illustrating a packer of the WFT tool changing in shape in response to a hydraulic actuation between a deflated configuration and an expanded configuration.
Figures 3A, 3B, 3C:
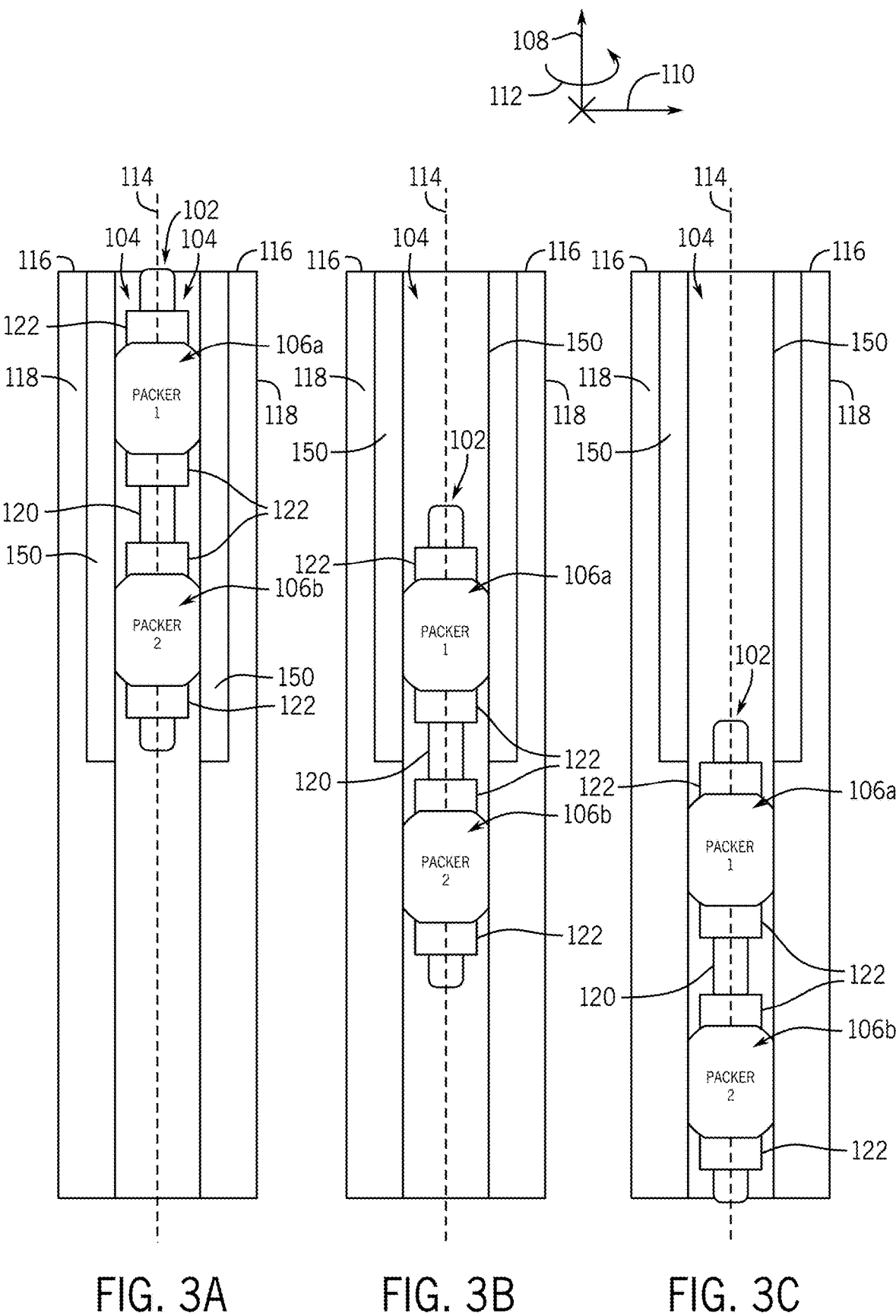
Figures 4A, 4B, 4C:
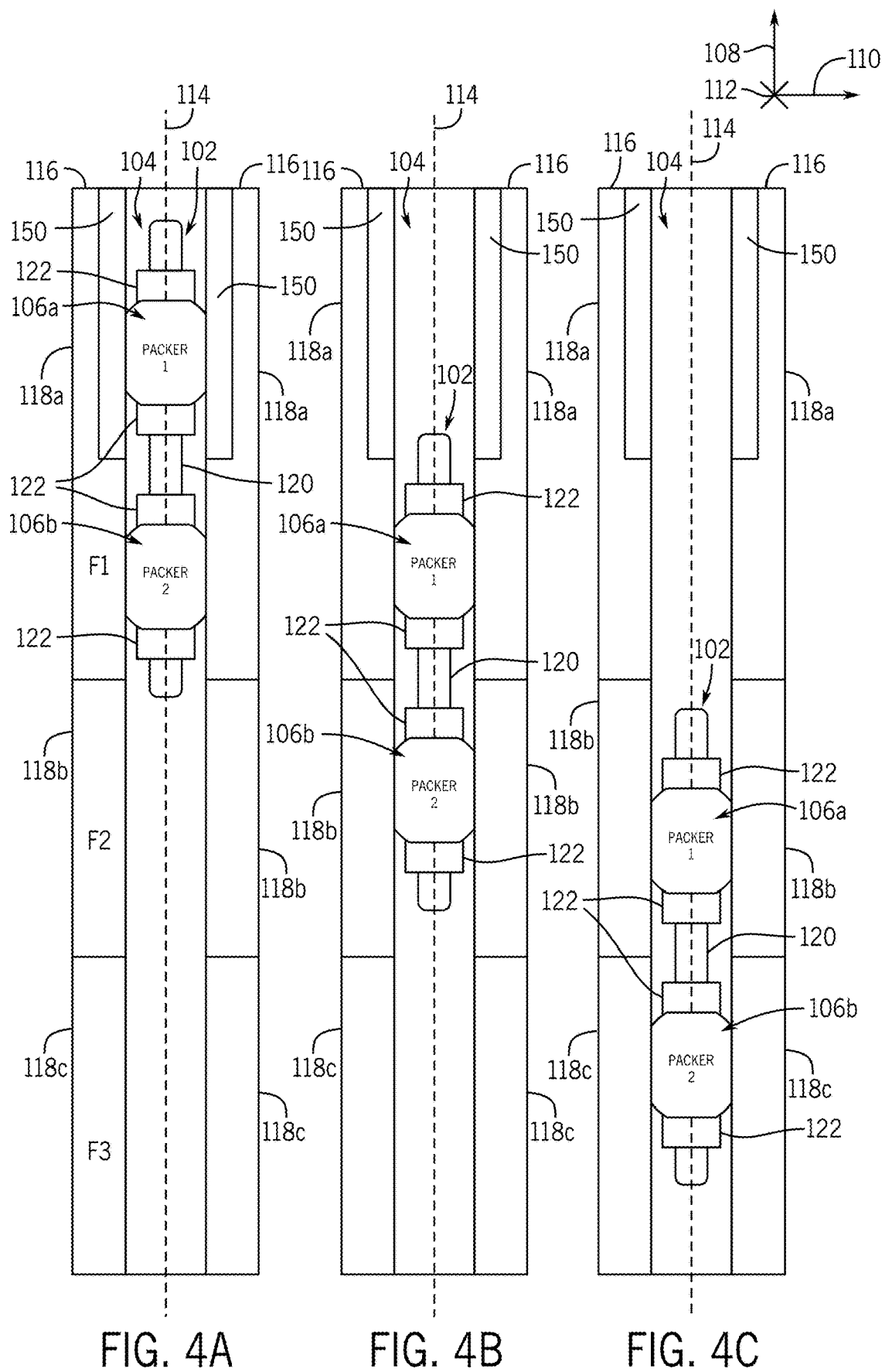
Figure 5:
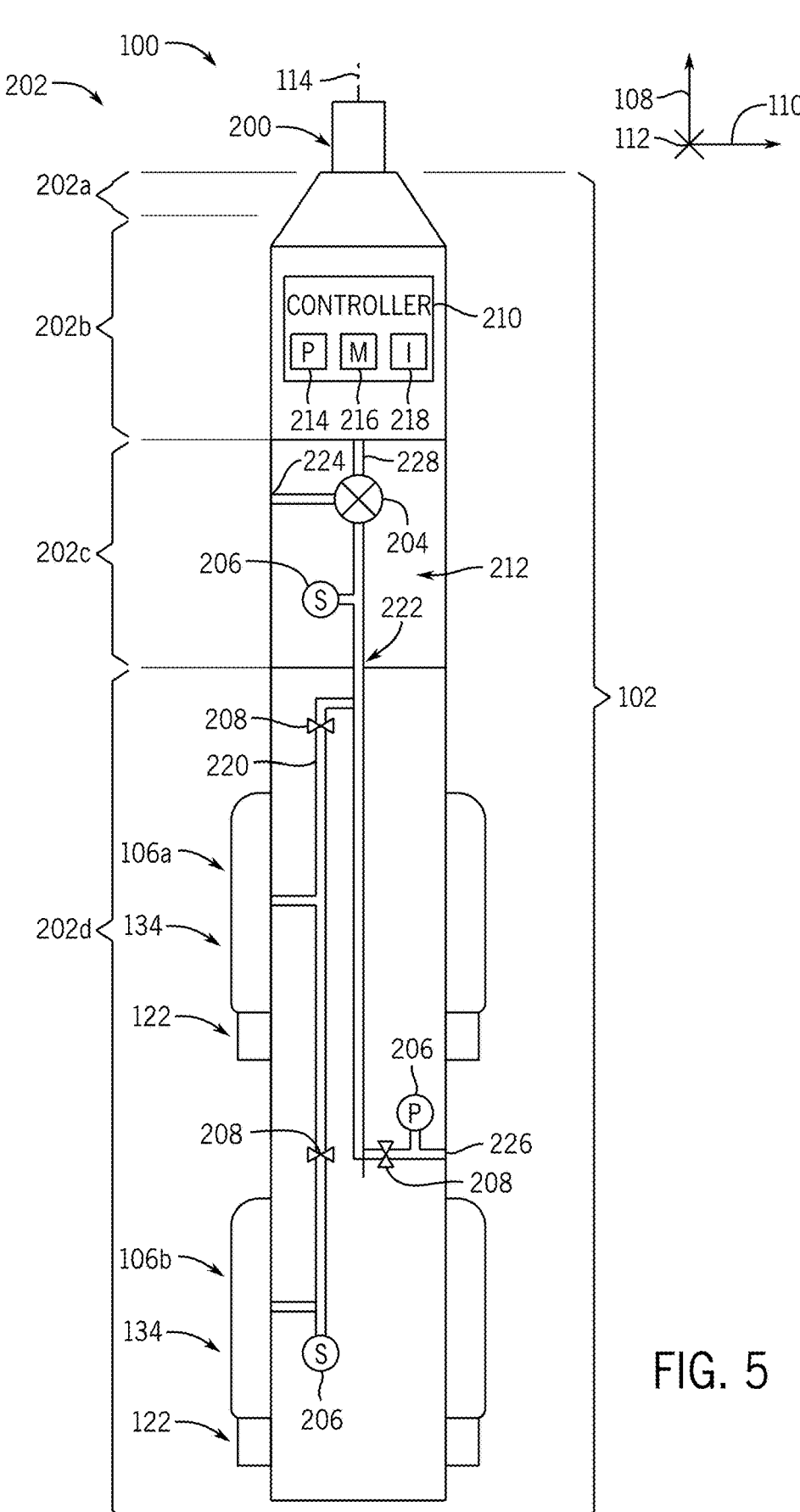
Figure 6:
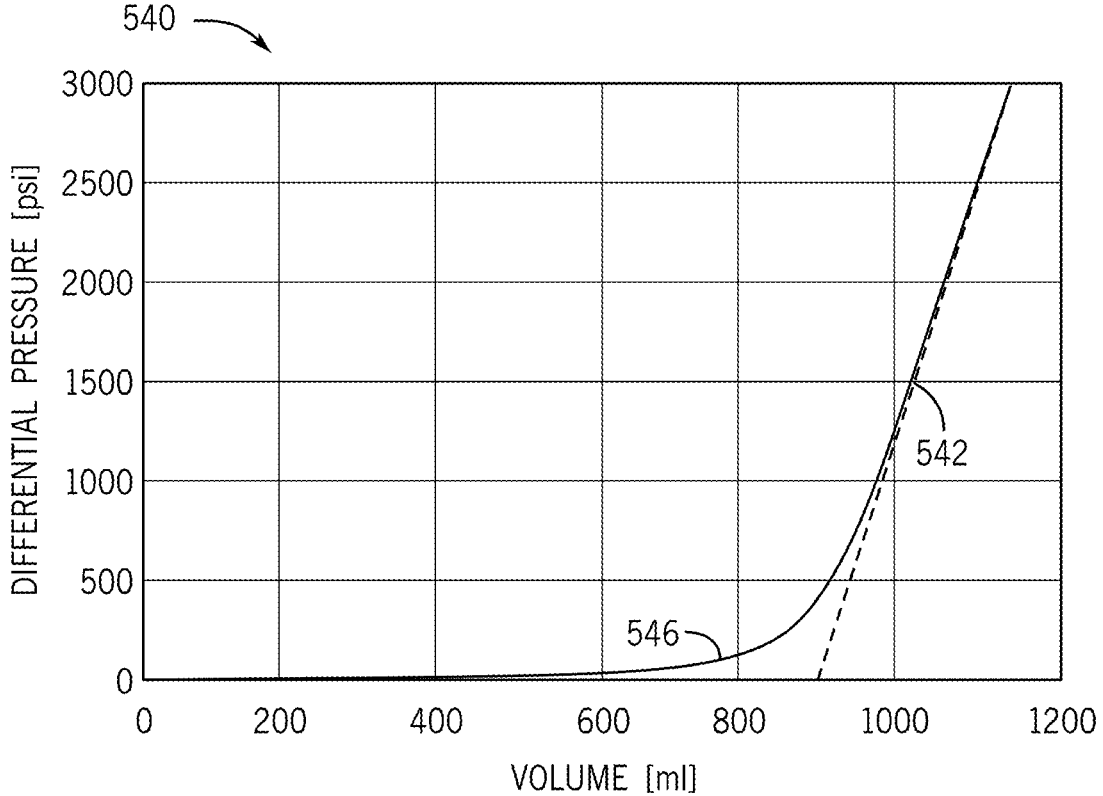
Figure 7:
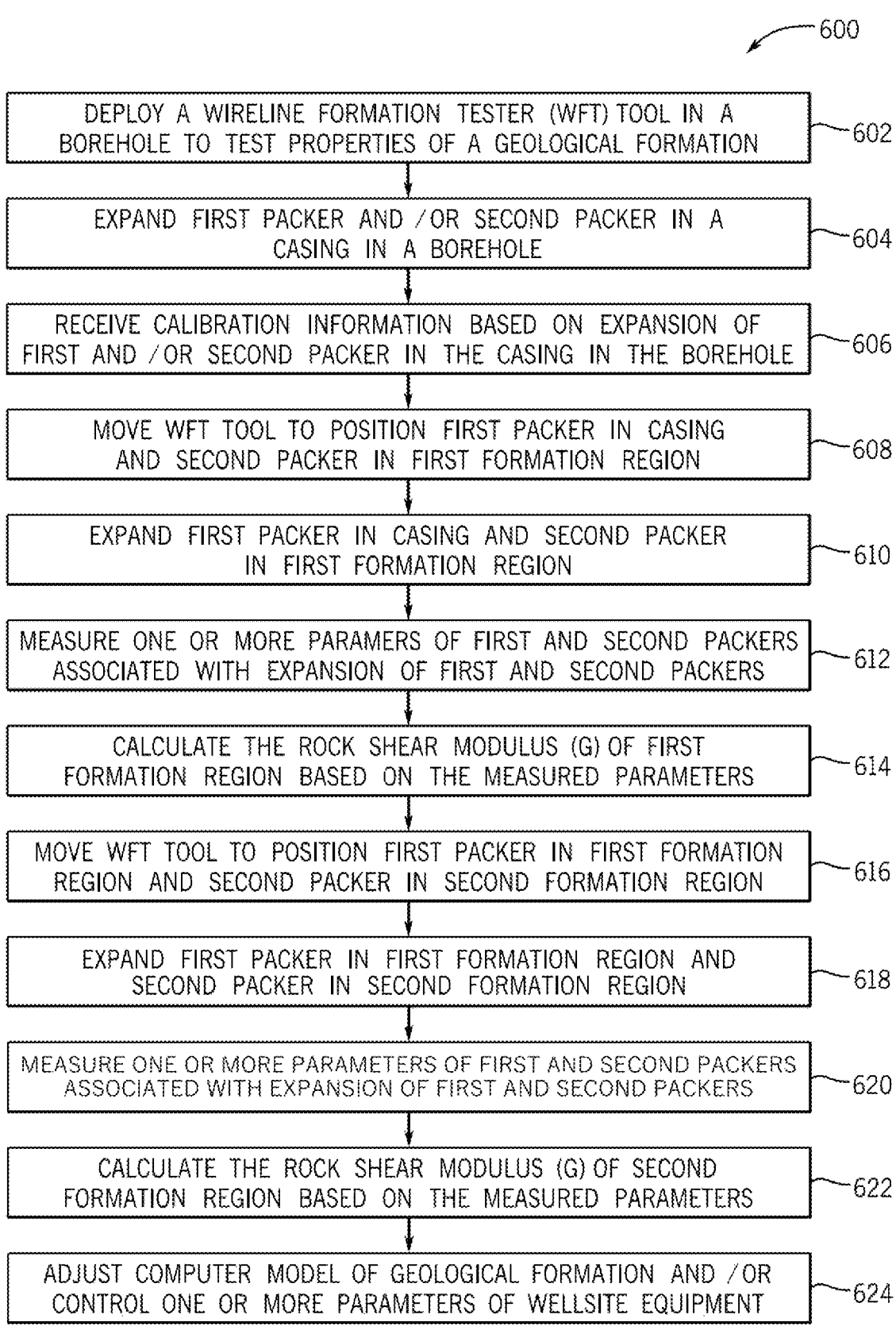

FIGS. 3A, 3B, and 3C are schematics of an embodiment of the process for deploying a WFT tool in a borehole to calibrate the WFT tool and measure the stiffness of the formation;

FIGS. 4A, 4B, and 4C are schematics of an embodiment of the process for deploying a WFT tool in a borehole to calibrate the WFT tool and measure the stiffness of the formation when the formation includes three different rock strata;

FIG. 5 is a schematic of an embodiment of the WFT tool of FIG. 1, illustrating control of the hydraulic actuation of the packers:

FIG. 6 is a graph displaying a pressure-volume curve for a shear modulus measured during a pressuremeter test using the WFT tool of FIG. 1, in accordance with the present disclosure; and FIG. 7 is a flow chart of an embodiment of a process of determining the static shear modulus (G) using the WFT tool of FIG. 1-5.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure illustrates an approach for obtaining the in situ static shear modulus (G) using a dual packer apparatus. The disclosed technique involves moving a wireline formation tester (WFT) tool from a reference casing or rock formation with a well-known stiffness to different formations of unknown stiffness. By exposing each packer of the WFT tool to similar or different formations, reference formations, or casing, the unknown stiffness and the static shear modulus (G) of the formation of interest may be obtained.

When fluid is injected into a packer in contact with a borehole or casing, only a portion of the injected fluid volume is accommodated by expansion of the borehole or casing wall. The remaining fluid may be accommodated by expansion of other parts of the system including valves, tubing, and the unrestrained portion of the packer. Compression of fluid already present in the system also creates additional volume. The measured stiffness is defined as the gradient of the pressure applied to the borehole with respect to the total injected fluid volume. This is distinct from the formation stiffness and the casing stiffness, which are the gradient of the same pressure with respect to the volume of injected fluid allocated to expanding the formation and the casing wall respectively. The measured stiffness depends on both the formation stiffness and the WFT tool stiffness, including the tubing, valves, fluid, and the unrestrained portion of the packer. In embodiments where the WFT tool contacts the casing, the measured stiffness depends on both the casing stiffness and the WFT tool stiffness, including the tubing, valves, fluid, and the unrestrained portion of the packer. However, the formation stiffness depends only on the properties of the rock. The rock shear modulus (G) may be approximated in terms of the formation stiffness by the following equation:

$$G = \frac{1}{4}\pi L D^2 M_r \qquad (1)$$

where L is the contact length of the packer with the formation, D is the borehole diameter, and $M_r$ is the rock formation stiffness which is generally unknown. Equation 1 assumes plane strain conditions, i.e., L/D is much greater than 1. More general methods for extracting the G from My are available, including multiplying equation 1 by an aspect ratio correction factor obtained from laboratory experiments or numerical models. The embodiments discussed in detail below include a process to determine the rock formation stiffness ($M_r$), which in turn is used to determine the rock shear modulus (G).

More specifically, as discussed in detail below, the process performs pressuremeter testing (PMT) using a WFT tool having a plurality of packers (e.g., 2, 3, 4, 5, or more packers). The PMT process includes an expansion of a packer against a surrounding wall of a borehole (e.g., casing or formation), and measurements of pressure in response to volume of fluid input into the packer. The measured stiffness is then determined as a slope of a curve depicting the pressure versus volume acquired during the PMT process. The WFT tool includes a plurality of packers at different positions, which may be positioned within a common material (e.g., only casing or only the same formation) or in different materials (e.g., casing and formation and/or different formations) at different stages of the process. The casing stiffness is generally known prior to the process described herein, whereas the WFT tool stiffness may be unknown. Therefore, the WFT tool may initially take PMT measurements in the casing to determine the tool stiffness. Alternatively, the WFT tool may initially take PMT measurements within some other structure having a known stiffness, thereby enabling a determination of the tool stiffness. Subsequently, the WFT tool may progressively move the plurality of packers through the borehole, wherein each movement of the WFT tool may position a first packer within a first material of known stiffness and a second packer within a second material of unknown stiffness. In this way, the unknown stiffness can be determined by the process based on the measured stiffness from the first and second packers, and the other known stiffnesses (e.g., known stiffness of WFT tool and known stiffness of the first material). Various aspects of this process are discussed in further detail below with reference to the drawings.

FIG. 1 is a schematic of an embodiment of a borehole containing a wireline logging system 100 having a wireline formation tester (WFT) tool 102 in a borehole 104, illustrating a packer 106 (e.g., annular packer) of the WFT tool 102 changing in shape in response to a hydraulic actuation between a deflated state or configuration 100a and an expanded state or configuration 100b. The WFT represents one particular embodiment of the PMT tool. However, wireline tools may sometimes be run on a drillpipe as logging while drilling (LWD) tools. Thus, the use of the term "WFT" is not meant to restrict the scope of the current invention to wireline tools. For purposes of discussion, reference may be made to an axial direction or axis 108, a radial direction or axis 110, and a circumferential direction or axis 112 relative to a central axis 114 of the WFT tool 102. The axial direction 108 may align with the central axis 114 of the WFT tool 102, such that the circumferential axis 112 aligns with the general geometry of the borehole 104. The borehole 104 may be substantially cylindrical and formed from drilling a hole from the surface 116 through one or more geological materials (e.g., rock, clay, etc.) of formation 118. Further, the borehole 104 may be wide enough to provide clearance 132 (e.g., radial clearance) between the WFT tool 102 and the borehole 104 for deployment to each of the plurality of axial positions prior to hydraulic actuation of the WFT tool 102. The amount of clearance 132 may be based on the amount the packer 106 may expand from the deflated configuration 100*a* to the expanded configuration 100*b*, the circumference of the borehole 104, the circumference of the deflated packer 106, and the like.

The WFT tool 102 may include a mandrel 120 (e.g., cylindrical mandrel), a sliding coupling 122 (e.g., annular coupling), and the packer 106. The packer 106 may be made of expandable material, such that the packer 106 may expand and exert pressure or deformation stress on the geological material of formation 118 (e.g., geological formation) surrounding the borehole 104. For example, the packer 106 may include an annular wall or body made of an elastomeric material, which expands in response to a hydraulic pressure applied to an internal hydraulic chamber. The WFT tool 102 includes one or more pressure sensors (e.g., packer sensors, internal sensors) coupled to and/or integrated within the packer 106 to measure one or more parameters, such as packer pressure, packer volume, internal radii, external radii, or a combination thereof. The sensors may measure the one or more parameters at one or more points in the expansion process from the deflated configuration 100*a* to the expanded configuration 100*b*. The sensors may be disposed in a plurality of axial positions along the axial axis 108, a plurality of radial positions along the radial axis 110, and a plurality of circumferential positions about the circumferential axis 112 of the WFT tool 102. Further, the sensors may be disposed at various positions along flow lines inside the packer 106.

The leading edge 134 of the packer 106 may be defined as the position (e.g., axial position along the axial axis 108 and radial position along the radial direction 110) about the circumference (e.g., in the circumferential direction 112) of the packer 106 making first contact with the circumference of the borehole 104 during the expansion process as the packer 106 radially expands in the radial direction 110. For example, for a symmetrical configuration of the packer 106, the leading edge 134 may be located midway (e.g., axial center point) along an axial length of the packer 106. In certain embodiments, the WFT tool 102 houses the sensors at one or more axial positions along the axial axis 108 of the packer 106. For example, the sensors may be disposed at the axial position within a flow line of the packer 106 and/or a plurality of axial positions (e.g., increments of 5, 10, 15, or 20 percent) along an axial length within a flow line of the packer 106.

As the packer 106 expands in the radial direction 110, the clearance 132 between the packer 106 and the borehole 104 gradually decreases until the packer 106 contacts and applies a force to the circumference of the borehole 104. The sensors of the WFT tool 102 record data relating to the packer 106 and the geometry of the borehole wall 138 before, during, and/or after the expansion process of the packer 106. The sensors may directly contact the flow lines of the packer 106. The expanded packer 106 may have a shorter expanded height 130 than the deflated height 140. Further, the expanded packer 106 may have a wider expanded diameter 128 than the deflated packer 106. As the packer 106 inflates, the sliding coupling 122 may slide over the mandrel 120, so the opposing axial ends 136 of the packer 106 are closer to each other along the axial axis 108. When deflated, the packer 106 may have a deflated length (e.g., height) 140 to deflated diameter 142 (L/D) ratio between 2 and 5. Conversely, when the packer 106 is fully expanded, the L/D ratio of the packer may be between 0.5 and 3. However, the L/D ratio may vary in various embodiments of the WFT tool 102 and deployments in a borehole 104. In some embodiments, the WFT tool 102 may exclude the sliding coupling 122, position the sliding coupling 122 on the opposite axial end 136 of the packer 106, and/or include other embodiments of the packer 106. As discussed in detail below, the measurements by the sensors may be used by the WFT tool 102 to determine various parameters of the geological material of formation 118, including the shear modulus (G). For example, during a PMT process using the WFT tool 102, the sensors may measure both a pressure and a volume of fluid supplied to the packer 106, and a pressure versus volume curve as shown in FIG. 6 may be used to calculate a stiffness of material surrounding the packers 106 (e.g., 106*a*, 106*b*). The stiffness in turn may be used to calculate the shear modulus (G) using Equation 1.

Figure 2:
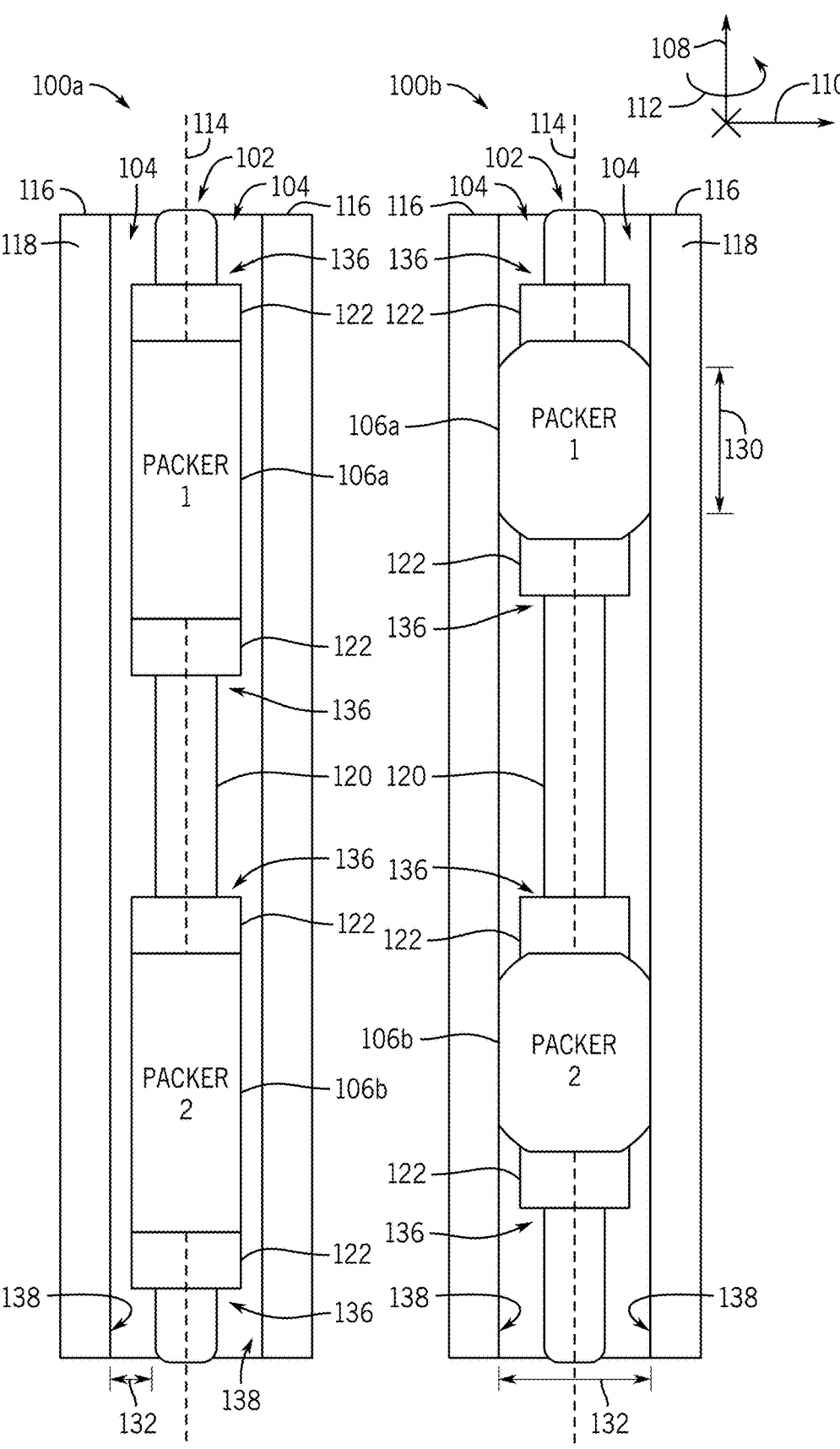
FIG. 2 is a schematic of an embodiment of a WFT tool in a borehole, illustrating two packers of the WFT tool changing in shape in response to hydraulic actuation between a deflated state or configuration and an expanded state or configuration.

FIG. 2 is a schematic of an embodiment of a borehole wireline logging system 100 having a WFT tool 102 in a borehole 104, illustrating two packers 106*a* and 106*b* (e.g., annular packers) of the WFT tool 102 changing in shape in response to a hydraulic actuation between a deflated state or configuration 100*a* and an expanded state or configuration 100*b*. In certain embodiments, the WFT tool 102 may include any number of packers 106 (e.g., 2, 3, 4, or more packers) in a series arrangement. The WFT tool 102 and packers 106 may operate in substantially the same manner as described in detail above with reference to FIG. 1, albeit with additional functionality due to the multiple packers 106 as described in further detail below. In some embodiments, the two packers 106*a*, 106*b* may inflate and deflate in conjunction with one another (e.g., actuation occurs simultaneously for both packers 106*a*, 106*b* at one time). In other embodiments, there may be one or more valves that isolate the packers 106*a*, 106*b* from each other, so the packers 106*a*, 106*b* may expand and deflate independently to take measurements as needed.

Further, the WFT tool 102 may be arranged such that the WFT tool 102 pressurizes the area of the borehole 104 between the two packers 106*a*, 106*b*. Pressurizing this area between the packers 106*a*, 106*b* may provide methods for taking more measurements of the pressure and volume of the packers 106*a*, 106*b* and the geological change of the formation 118 itself when pressurized. As such, pressurizing the space between the packers 106*a*, 106*b* in the formation may be beneficial.

In certain embodiments, there may be sensors along fluid passages within the WFT tool 102 to measure the pressure of each packer 106*a*, 106*b* when expanded, and the volume of fluid directed to each packer 106*a*, 106*b* to expand each packer. The sensors are discussed more in the description for FIG. 5. During a PMT process using the WFT tool 102, the sensors may measure both a pressure and a volume of fluid supplied to the packers 106 (e.g., 106*a*, 106*b*), and a pressure versus volume curve as shown in FIG. 6 may be used to calculate a stiffness of material surrounding the packers 106 (e.g., 106*a*, 106*b*). In particular, the slope of the linear portion of the curve of FIG. 6 may represent a stiffness of the material surrounding the packers 106 (e.g., 106*a*, 106b), such as the stiffness of the formation 118 or the casing 150. The stiffness in turn may be used to calculate the shear modulus (G) using Equation 1.

Further, in some embodiments, the WFT tool 102 may have more than two packers 106a, 106b. Specifically, in some embodiments, the WFT tool 102 may have three, four, five, or more packers 106 based on the formation 118 and the goals of the system. For example, formations 118 with more than two types of geological material may benefit from using a different packer 106 in each section of the borehole with a different type of geological material. However, while it may be possible or advantageous to utilize more than two packers 106, the same results may be obtained with the use of only two packers 106 when using the process and equations described in more detail below:

FIG. 3 is a schematic of an embodiment of the process for deploying a WFT tool 102 in a borehole to calibrate the WFT tool 102 and measure the stiffness of the formation 118. In the illustrated embodiment, FIG. 3 is broken into three separate steps, FIG. 3A, FIG. 3B, and FIG. 3C. FIG. 3A illustrates the calibration step of the process, including deploying the packer WFT tool 102 with all packers 106 within the casing 150 at the upper portion of the borehole 104 in the axial direction 108. Within the casing 150, one or more of the packers 106 (e.g., the upper packer 106a, the lower packer 106b, both packers 106a, 106b) may expand to measure the stiffness of the casing 150 surrounding the packers 106. As discussed in further detail below, the stiffness of the casing 150 is known prior to any measurements in the borehole 104, whereas the stiffness of the WFT tool 102 is generally unknown. However, the calibration process of FIG. 3A determines the stiffness of the WFT tool 102 (e.g., system stiffness $M_s$) based on the known stiffness of the casing 150 (e.g., casing stiffness $M_c$) and the measured stiffness in the casing 150 (e.g., measured stiffness $M_{mc}$), wherein the measured stiffness of the casing 150 is based on the expansion of the packers 106 and corresponding PMT measurements (e.g., pressure versus volume measurements) during the expansion process. In particular, the slope of the linear portion of the curve of FIG. 6 may represent the measured stiffness in the casing 150 which depends on the stiffness, $M_c$, of the casing 150 and the stiffness, $M_s$, of the WFT tool 102 when taking measurements from the packers 106 (e.g., 106a, 106b) in the configuration of FIG. 3A.

As discussed below, with reference to FIGS. 3A, 3B, and 3C, the process enables a determination of the stiffness of the formation 118 surrounding the borehole 104 after the calibration step of FIG. 3A is complete, because the previously unknown stiffness of the WFT tool 102 (e.g., system stiffness $M_s$) is determined during the calibration step. The stiffnesses of the materials (e.g., formation 118 or the casing 150) around the packers 106 (e.g., 106a, 106b) may be $M_{p1}$ and $M_{p2}$. The process involving calibration step of FIG. 3A may infer the stiffness, $M_s$ of the system, 102, whereas the process involving the packer positions of FIGS. 3B and 3C may yield an unknown stiffness, $M_r$ of the formation 118 after the calibration step is complete. As noted above, the casing or reference stiffness is determined prior to WFT tool 102 deployment and is symbolized by Mc, whereas the measured stiffness when both packers 106 (e.g., 106a, 106b) of the WFT tool are in contact with the casing 150 or reference material is $M_{mc}$. $M_m$ may represent the measured stiffness when one or both packers 106 (e.g., 106a, 106b) are in contact with the target rock formation 118. In the calibration step of FIG. 3A, all packers 106 may be in contact with the casing 150. In contrast, the process transitions to position one packer 106b in the formation 118 while one packer 106a remains in the casing 150 in FIG. 3B, and the process transitions to position both packers 106 (e.g., 106a, 106b) in the formation 118 in FIG. 3C. The process may progressively determine unknown variables as the process transitions the WFT tool 102 and the packers 106 (e.g., 106a, 106b) through the positions shown in FIGS. 3A, 3B, and 3C, as discussed below with reference to the following equations.

When the entire WFT tool 102 and its packers 106 are subject to the same fluid pressure, the equation for the conservation of injected fluid mass is shown in equation 2 below.

$$\frac{1}{M_{mc}} = \frac{1}{M_s} + \frac{1}{M_{p1}} + \frac{1}{M_{p2}}. \tag{2}$$

Note that $M_s$ includes the stiffness of tubing, valves, fluid, and the unrestrained portion of the packer. Both packers 106 face the wall of the casing 150 during the calibration step of FIG. 3A, so $M_{p1}=M_{p2}=M_c$. As such, during the calibration step, equation 3 may behave as a simplified version of equation 2.

$$\frac{1}{M_{mc}} = \frac{1}{M_s} + \frac{2}{M_c} \tag{3}$$

Equation 3 assumes both packers 106 have an identical design. Equation 3 has one unknown, $M_s$ (system stiffness), one measured quantity, $M_{mc}$ (measured casing stiffness), and one known quantity, $M_c$ (casing stiffness). Therefore it is possible to obtain $M_s$ (system stiffness) from equation 3. As illustrated in FIGS. 3A, 3B, and 3C, the system stiffness $M_s$ corresponds to the stiffness of the WFT tool 102, the measured casing stiffness $M_{mc}$ corresponds to the stiffness of the casing 150 determined based on the measurements (e.g., pressure versus volume measurements) during expansion of the packers 106 (e.g., 106a, 106b) within the casing 150 as shown in FIG. 3A, and the casing stiffness Mc is known for the casing 150 prior to deployment of the WFT tool 102 in the borehole 104.

As illustrated in FIG. 3B, the measured stiffness $M_{m1}$ is an effective stiffness based on the measurements from one packer 106b in the formation 118 beyond the casing 150 and another packer 106a in the casing 150. The measured stiffness $M_{m1}$ can be determined based on the slope of the linear portion of the curve representing the pressure versus volume of fluid supplied to the packers 106 (e.g., 106a, 106b) as shown in FIG. 6. The measured stiffness may be defined by equation 4 below.

$$\frac{1}{M_{m1}} = \frac{1}{M_s} + \frac{1}{M_{p1}} + \frac{1}{M_{p2}} \tag{4}$$

In the second step of the process illustrated in FIG. 3B, $M_{p1}=M_c$ represents the stiffness of the upper packer 106a (e.g., the packer in the casing 150) and $M_{p2}=M_r$ represents the stiffness of the lower packer 106b (e.g., the packer 106 in the formation 118). As such, equation 4 above may be clarified to equation 5 below.

$$\frac{1}{M_{m1}} = \frac{1}{M_s} + \frac{1}{M_c} + \frac{1}{M_r} \tag{5}$$

The rock stiffness, $M_r$, can be estimated from equation 5, since all other quantities on the right-hand side of the equation are known from the calibration measurement in equation 3.

In the third step of the process illustrated in FIG. 3C, both packers 106a, 106b are in the same formation 118 (e.g., no packer 106 in the casing 150). When both packers 106a, 106b are in the same formation_118, the measured stiffness is illustrated by equation 6 below, and its simplified form, equation 7, obtained by setting $M_{p1}=M_{p2}=M_r$.

$$\frac{1}{M_{m2}} = \frac{1}{M_s} + \frac{1}{M_{p1}} + \frac{1}{M_{p2}} \tag{6}$$

$$\frac{1}{M_{m2}} = \frac{1}{M_s} + \frac{2}{M_r} \tag{7}$$

In equations 7, $M_s$ is known and makes it possible to obtain $M_r$ from equation 7. In summary, the foregoing equations 2-7 may be used to progressively determine unknowns (e.g., WFT tool stiffness and formation stiffness) when using multiple packers 106 (e.g., 106a, 106b) positioned within different materials surrounding a borehole 104, thereby enabling determination of the formation stiffness. The formation stiffness in turn may be used to calculate the shear modulus (G) using Equation 1. In certain embodiments, the process described above with reference to FIGS. 3A, 3B, and 3C and equations 1-7 may be programmed into a controller of the WFT tool 102, such that the WFT tool 102 can obtain measurements, calculate the unknown stiffness of the WFT tool 102 and the formation, calculate the shear modulus (G), and control various aspects of the borehole wireline logging system 100.

FIG. 4 is a schematic of an embodiment of the process for deploying WFT tool 102 in a borehole 104 to calibrate the WFT tool 102 and measure the stiffness of the formation 118 when the formation 118 includes three different formation material sections 118a, 118b, 118c. The embodiment of FIG. 4 is substantially the same as described in detail above with reference to FIG. 3, except that the embodiment of FIG. 4 enables calculations of formation stiffnesses when progressively moving the WFT tool 102 through any number of different formation materials, such as the different formation material sections 118a, 118b, 118c.

In embodiments where both packers 106a, 106b face slightly different formation material sections, equation 7 may be modified as shown in equation 8.

$$\frac{1}{M_{m2}} = \frac{1}{M_s} + \frac{1}{M_{rm}} \tag{8}$$

where $$\frac{1}{M_{rm}} = \frac{1}{M_{r1}} + \frac{1}{M_{r2}}$$

with $M_{r1}$ and $M_{r2}$ represent the stiffnesses of each of the formations 118 being tested by the PMT process via the packers 106a, 106b. $M_{rm}$ is a harmonically averaged value of the stiffnesses of each material section of the formation 118.

In embodiments where the formation thickness is smaller than the separation between the mid-points of the two packers 106a, 106b, l, the packers 106 may be moved successively along the borehole 104 by distance of l, such that one packer 106 is always placed opposite a previously tested formation (e.g., where the stiffness has been determined and thus is known) and the other is placed opposite an untested formation (e.g., 118a and 118b, 118b and 118c). The successive packer movements may start from the casing 150 or reference formation material and continue axially downward into the borehole 104. The following successive set of equations may provide a mathematical process to account for the case in which the formation thickness is smaller than the separation between the mid-points of the two packers 106a, 106b:

$$\frac{1}{M_{mc}} = \frac{1}{M_s} + \frac{2}{M_c} \tag{9}$$

$$\frac{1}{M_{m1}} = \frac{1}{M_s} + \frac{1}{M_c} + \frac{1}{M_{rF1}} \tag{10}$$

$$\frac{1}{M_{m2}} = \frac{1}{M_s} + \frac{1}{M_{rF1}} + \frac{1}{M_{rF2}} \tag{11}$$

$$\frac{1}{M_{m3}} = \frac{1}{M_s} + \frac{1}{M_{rF2}} + \frac{1}{M_{rF3}} \tag{12}$$

Equations 9-10 may be solved to obtain the stiffness of formation i, $M_{rFi}$, from the measured stiffness $M_{mi}$, where i=1, 2, 3, . . . . Consequently, discrete values of G may be measured with a sampling interval of l. In the illustrated embodiment, the formation has three layers of formation material 118a, 118b, 118c. However, there may be more than 3 layers. Equations 9-12 above may be supplemented with further equations in a similar format to obtain the stiffness of each layer. Similarly, equations 2-12 may be extended to cover multipacker systems with three or more packers. As such, the current disclosure is not limited in scope to dual packer tools.

As illustrated in FIG. 4, the process may start after the calibration step similar to FIG. 3A and equation 3, whereby the calibration step uses the known casing stiffness $M_c$ and the measured casing stiffness $M_{mc}$ of the casing 150 to determine the system stiffness $M_s$ of the WFT tool 102. The process then proceeds to FIG. 4A, which is similar to the process described above with reference to FIG. 3A. In particular, equation 10, which is similar to equation 5, is used to determine the formation stiffness $M_{rF1}$ of the formation material section 118a based on the known system stiffness $M_s$ of the WFT tool 102, the known casing stiffness $M_c$ of the casing 150, and the measured stiffness $M_{m1}$. The measured stiffness $M_{m1}$ is based on the slope of the linear portion of the pressure versus volume curve as shown in FIG. 6 based on the PMT process for both of the packers 106a and 106b in the illustrated position of FIG. 4A.

The process then proceeds to FIG. 4B, which is similar to the process described above with reference to FIG. 3A, except that the packers 106a and 106b are disposed in different formations. In particular, equation 11 is used to determine the formation stiffness $M_{rF2}$ of the formation material section 118b based on the known system stiffness $M_s$ of the WFT tool 102, the known formation stiffness $M_{rF1}$ from the previous step of FIG. 4A, and the measured stiffness $M_{m2}$. The measured stiffness $M_{m2}$ is based on the slope of the linear portion of the pressure versus volume curve as shown in FIG. 6 based on the PMT process for both of the packers 106a and 106b in the illustrated position of FIG. 4B.

The process then proceeds to FIG. 4C, which is similar to the process described above with reference to FIG. 4B, except that the packers 106a and 106b are disposed in different formations. In particular, equation 12 is used to determine the formation stiffness $M_{rF3}$ of the formation material section 118c based on the known system stiffness $M_s$ of the WFT tool 102, the known formation stiffness $M_{rF2}$ from the previous step of FIG. 4B, and the measured stiffness $M_{m3}$. The measured stiffness $M_{m3}$ is based on the slope of the linear portion of the pressure versus volume curve as shown in FIG. 6 acquired from the PMT process for both of the packers 106a and 106b in the illustrated position of FIG. 4C. As appreciated, the foregoing process may continue for any number of subsequent formation layers, provided at least one of the packers (e.g., packer 106a) is disposed in a known formation (e.g., known formation stiffness) and one of the packers (e.g., packer 106b) is disposed in an unknown formation (e.g., unknown formation stiffness). Again, the formation stiffness, once known, is then used to calculate the rock shear modulus (G) based on equation 1 as described above.

In certain embodiments, the process described above with reference to FIGS. 3 and 4 and equations 1-12 may be programmed into a controller of the WFT tool 102, such that the WFT tool 102 can obtain measurements, calculate the unknown stiffness of the WFT tool 102 and the formation, calculate the shear modulus (G), and control various aspects of the borehole wireline logging system 100. Thus, the process may include instructions (e.g., including the above equations 1-12) stored on a computer readable medium and executable by one or more processors to carry out the process described in detail above.

In embodiments where formation thicknesses are larger than l, a similar procedure may be employed as in the previously described embodiment. However, the accuracy of equations 9-12 may benefit from a larger sampling interval. In certain embodiments, the WFT tool 102 may include one or more adjusters (e.g., motorized or hydraulic adjusters) that adjust the distance of/between the packers 106a and 106b. In certain embodiments, the WFT tool 102 may include 3, 4, 5, or more packers 106 with various distances between the packers 106 to provide more options for the PMT process described above, particularly to account for different thicknesses of formation layers.

In addition to using the dual packer pressure vs volume curves to infer downhole in situ static elastic moduli, the dual packer arrangement may be used to perform PMT using the pressurization of the interval between the packers 106. In this embodiment, the packers 106 are first inflated to hydraulically isolate the interval of borehole 104 between the packers 106a, 106b. Fluid (e.g., gas, liquid) may then be pumped into the interval through a pressure pump. The amount of fluid pumped to the interval and the pressure generated by the fluid may be measured using sensors in the fluid passages of the WFT tool 102, as described below: Then, the pressure-versus-volume response may be interpreted using equations 1-12 above to estimate the stiffness of the formation in the interval between the packers 106.

Consequently, as the interval is pressurized, the packers 106 may respond to the interval pressurization. Therefore, there may be a change in stiffness of the system due to the response of the packers 106. In embodiments in which the interval between the packers 106 is pressurized, the response of the packers 106 may depend on the formation in front of the interval, as well as on that behind the packers 106.

FIG. 5 is a schematic of an embodiment of the WFT tool 102 on a line. The WFT tool 102 and line 200 extend along the central axis 114. In certain embodiments, the line 200 may include a conduit or a wireline. The WFT tool 102 may include the two or more packers 106a, 106b, one or more sensors 206, and the sliding coupling 122, as discussed in the description of FIG. 1. Further, the WFT tool 102 may include a plurality of tool sections 202, including a cap section 202a, a controller section 202b, a pump section 202c, and a packer section 202d. Each of the tool sections 202 may include an annular body portion housing and/or supporting components of the WFT tool 102. For example, the controller section 202b includes a controller 210, the pump section 202c includes one or more pumps 204 and one or more sensors 206, and the packer section 202d includes the packer 106 and one or more sensors 206. In the illustrated embodiment, the WFT tool 102 includes a fluid circuit 212 (e.g., hydraulic fluid circuit) extending at least through the pump section 202c and the packer section 202d in fluid communication with the pump 204, the one or more sensors 206, the valves 208, and the two or more packers 106a, 106b. The controller 210 has a processor 214, a memory 216, and instructions 218 stored on the memory 216 and executable by the processor 214 to control various components of the WFT tool 102. The controller 210 is configured to monitor sensor feedback from the one or more sensors 206 and control the pump 204 and the valves 208 to operate an expansion process of the two or more packers 106a, 106b for the PMT process. Additionally, the controller 210, a remote controller, and/or a remote computer system is configured to analyze the sensor feedback from the one or more sensors 206 to determine various parameters of the geological material of formation 118, including the formation stiffness and the shear modulus (G) as discussed above and in further detail below.

In the illustrated embodiment, the fluid circuit 212 includes fluid passages 220 and 222 for hydraulically actuating the packers 106 (e.g., 106a, 106b). The fluid passage 222 extends through the WFT tool 102 between fluid ports 224 and 226 in fluid communication with the borehole. In some embodiments, the fluid passage 222 is coupled to a supply fluid passage 228 extending through the WFT tool 102 and/or the line 200 to a fluid supply, such as a fluid supply tank. However, in the illustrated embodiment, the controller 210 is configured to execute an expansion process of one or more of the packers 106 (e.g., 106a, 106b) by closing the valve 208 adjacent the fluid port 226, opening the valve 208 along the fluid passage 220 leading to the respective packers 106 (e.g., 106a, 106b), and operating the pump 204 to pump a wellbore fluid (e.g., used as a hydraulic fluid) through the fluid passages 220, 222 to one or more of the packers 106 (e.g., 106a, 106b) to expand one or more of the packers 106 (e.g., 106a, 106b) in the radial direction 110 as discussed above with reference to FIG. 1. Upon complete expansion of one or more of the packers 106 (e.g., 106a, 106b), the controller 210 may close the valve 208 along the fluid passage 220 to retain fluid pressure in one or more of the packers 106 (e.g., 106a, 106b) to hold the expanded configuration of the one or more packers 106 (e.g., 106a, 106b).

During the expansion process (e.g., PMT process), the one or more sensors 206 may monitor various parameters of the fluid supplied to the packers 106 (e.g., 106a, 106b), including but not limited to a pressure, a fluid volume or a flowrate, or any combination thereof. As such, the one or more sensors 206 may be flow rate gauges or sensors, pressure gauges or sensors, or any other sensor configured to measure fluid throughput and pressure. The one or more sensors 206 may further monitor parameters of the borehole 104 and/or the geological material of formation 118 before, during, and/or after the expansion process. Further, the one or more sensors 206 may be located along the fluid passages 220, 222 to monitor volumetric flow through the passages 220, 222 and into the packers 106 (e.g., 106a, 106b). Further, the one or more sensors 206 may be located within the packers or along the flow passages 220, 222 to monitor the pressure in the packers 106 (e.g., 106a, 106b), or in the interval between the formation wall and WFT tool 102 between the inflated packers 106 (e.g., 106a, 106b). Similarly, the controller 210 is configured to execute a contraction process of the packers 106 (e.g., 106a, 106b) by opening the valve 208 adjacent the fluid port 226 and opening the valve 208 along the fluid passage 220, thereby enabling the fluid to vent into the borehole 104 via the fluid ports 224 and/or 226 and enabling the packers 106 (e.g., 106a, 106b) to contract in the radial direction 110. In some embodiments, the formation stiffness and the static shear modulus (G) may be determined based on the measurements by the one or more sensors 206 before, during, and/or after the expansion process, the contraction process, or a combination thereof. The WFT tool 102 of FIG. 5 may be used with any of the WFT tools 102 and processes described herein with reference to the drawings.

FIG. 6 shows a typical pressure versus volume curve 540 to determine the influence of the shear and bulk moduli on the P-V curve 546. As illustrated, the slope dP/dV, is initially small and then increases dramatically as the packer 106 contacts the borehole wall. As shown in 540, eventually the slope stabilizes when the volume lies beyond approximately 850 ml, as illustrated in the pressure versus volume curve. This stabilized slope is the measured stiffness, $M_m$, and it may be influenced by the elastic stiffness of the formation as well as the stiffnesses of other components of the system such as tubings, valves, and the like. Accordingly, as noted above, it may be possible to extract the stiffness of the formation from the final slope 542 as discussed above with reference to equations 1-10.

FIG. 7 illustrates a flow chart of an embodiment of a process 600 of determining the static shear modulus (G) using the WFT tool of FIGS. 1-5 and the equations described in detail above. The process 600 is described with reference to first and second packers of a WFT tool; however, the WFT tool may include any number of packers (e.g., 2, 3, 4, 5, or more) within the scope of the described process 600. At block 602, the rock shear modulus calculation system may deploy a WFT tool in a borehole to test the properties of a geological formation. The process 600 may be at least partially or entirely performed via a computer system, a controller, a WFT tool, or a combination thereof, having instructions stored on memory and executable by one or more processors. For example, the process 600 may be entirely performed via the WFT tool 102 described above and via a combination of the WFT tool 102 and a computer system separate from the WFT tool 102 (e.g., surface computer, remote computer, etc.).

At block 604, the rock shear modulus calculation system may expand a first packer and/or a second packer in a casing in a borehole. The rock shear modulus calculation system may expand the first packer and/or the second packer in a casing by pumping fluid into the first packer and/or the second packer in the casing and measuring the pressure of the inflated packer(s) and the amount of fluid pumped (e.g., volume) into the packer(s) to achieve that pressure. As described above, the casing may have a known stiffness. As such, measuring the volume of fluid in the packer(s) and the pressure of the inflated packer(s) in the casing may calibrate the rock shear modulus calculation system. In many embodiments, all of the packers of the WFT tool may inflate in the casing at least one time to calibrate the rock shear modulus calculation system using the entirety of the WFT tool. The pressure of each packer may be identical, particularly if the packers are in hydraulic communication.

Once the packers are expanded, at block 606, the rock shear modulus calculation system may receive calibration information based on the expansion of the first packer and/or the second packer in a casing in the borehole. The calibration information may be based on the pressure of the packers in the casing of known stiffness compared to the volume of fluid in the packer as illustrated in FIG. 6. The calibration information may inform the rock shear modulus calculation system for future measurements inside the formation.

The process 600 then moves the WFT tool to position the first packer in the casing and the second packer in the first formation region in block 608. The following discussion will progressively discuss the steps 610-624 in sequence. At block 610, the rock shear modulus calculation system may expand the first packer in the casing and the second packer in the first formation region of the borehole to cause a geometrical change in the borehole after moving the WFT tool in block 608. In certain embodiments, there may be one packer in the casing and one packer in the first formation region. However, there may be embodiments in which two or more packers remain in the casing when the bottom-most packer in the axial direction is in the first formation region. In some embodiments, only the bottom most packer in the axial direction may inflate, while the one or more packer in the casing remains uninflated. In other embodiments, all of the packers may inflate simultaneously. Inflating the packer may cause a geometrical change in the packer. As the packer changes shape, the packer may press against the formation wall of the first formation region, which may cause a geometrical change in the formation wall based on the stiffness of the formation wall. Any deformation in the formation wall may impact the calculation of the stiffness and the rock shear modulus of the formation.

Once the first and second packers are expanded, at block 612, the rock shear modulus calculation system may measure one or more parameters of the first packer and second packers associated with expansion of the first and second packers and the geometrical change in the borehole resulting from the expansion of the packers. The one or more parameters may be volumetric flow to the first and second packers, pressure in the first and second packers, and the like. The pressure in the first and second packers and volume of fluid in the first and second packers may impact the geometrical shape of both the inflated first and second packers and the formation wall as the inflated second packer expands against the formation wall. For example, the measurements of block 610 may be used to output a pressure versus volume curve as shown in FIG. 6.

At block 614, the rock shear modulus calculation system may calculate the rock shear modulus (G) of the first formation region based on the measured parameters (e.g., formation stiffness). As described above, the rock shear modulus calculation system may use the equations 1-10 discussed in detail above in relation to FIGS. 3 and 4 to calculate the formation stiffness and the rock shear modulus (G) of a formation.

In block 616, the process 600 then moves the WFT tool to position the first packer in the first formation region and the second packer in the second formation region. In block 618, the rock shear modulus calculation system may expand the first packer in the first formation region and the second packer in the second formation region of the borehole to cause a geometrical change in the borehole after moving the WFT tool. In certain embodiments, the first and second packers may expand simultaneously or at different times. Additionally, in certain embodiments, the WFT tool may include a plurality of first packers expanding in the first formation and/or a plurality of second packers expanding in the second formation region.

At block 620, the rock shear modulus calculation system may measure one or more parameters of the first packer and the second packer associated with the expansion of the first and second packers and the geometrical change in the borehole. The one or more parameters may be volumetric flow to first and second packers, pressure in the first and second packers, and the like. The pressure in the first and second packers and volume of fluid in the first and second packers may impact the geometrical shape of both the inflated first and second packers and the formation wall as the inflated first and second packers expand against the formation wall in the first and second formation regions. In embodiments in which two or more adjacent packers are inflated, the rock shear modulus calculation system may also pressurize the space between the inflated packers between the WFT tool and the formation. The WFT tool may then measure the pressure in the formation between the inflated packers and the volume of fluid used in the space between the inflated packers. For example, the measurements of block 620 may be used to output a pressure versus volume curve as shown in FIG. 6.

At block 622, the rock shear modulus calculation system may calculate the rock shear modulus (G) of the second formation region using the measured parameters (e.g., formation stiffness). As described above, the rock shear modulus calculation system may use the equations 1-10 discussed in detail above in relation to FIGS. 3 and 4 to calculate the formation stiffness and the rock shear modulus (G) of a formation.

In some embodiments, the process 600 may continue in a similar manner as blocks 616-622 for any number of additional formation regions, such as a third formation region, a fourth formation region, etc. up to an Nth formation region. Each iteration uses previously calculated formation information (e.g., formation stiffness, G value) in the next formation region. Additionally, the process 600 may operate in a similar manner for any number of multiple packers, not limited to only two packers. The multiple packers may include the same or similar constructions, or different constructions, depending on the particular embodiment of the WFT tool. Additionally, the first packer or second packer may take the form of a compound packer consisting of two or more adjacent sub-packers.

Once the rock shear modulus calculation system has calculated the rock shear modulus of the first and second formations (or any number of formation regions), at block 624, the rock shear modulus calculation system may adjust one or more computer models and/or one or more wellsite parameters of the wellsite system based on the calculated G values. For example, the computer models may be substantially improved to better characterize and simulate the geological formation around the current well and/or one or more nearby wells. By further example, the wellsite parameters may include drilling parameters, production parameters, or other well operational parameters of the current wellsite or a different wellsite. The drilling parameters may be adjusted for different wells, such as nearby wells. The drilling parameters may include a composition and flow rate of a drilling mud, a rotational speed of a drill string and/or drill bit, a direction of drilling of a bottom hole assembly (BHA), a weight on bit, or any combination thereof, based on one or more computer models and the G value(s). The G value(s) may be used to improve the computer models, which may include drilling operation models to simulate drilling operation, geological models of a geological formation, production models to simulate production of fluids from a geological formation, or any combination thereof. For example, the computer models may include a mechanical earth model (MEM). The MEM may be a repository of data representing the mechanical properties of geological material (e.g., rocks) and fractures as well as the stresses, pressures, and temperatures existing in them at depth. Each data point in an MEM is referenced to its spatial coordinates (e.g., three-dimensional coordinates) and time. The measurements included in a MEM may include the magnitude of the vertical stress, the magnitude of the minimum horizontal stress, the magnitude of the maximum horizontal stress, the pore pressure, the G value, and the like. The MEM may include measurements accounting for the effects of reservoir fluids accumulated over geologic history, cumulative present-day hydrocarbon extraction, fluid injections to stimulate recovery, gravity, and the far-field tectonic stresses. The accuracy of the MEM may generally increase as more data measured by the sensors is acquired and used by the method. The availability of G values through the disclosed method may provide faster methods of building an MEM model than traditional methods, as traditionally, the MEM model may have to wait days for laboratory to test samples of geological material from the borehole to acquire values of G. The MEM may be used to increase drilling safety, prevent sanding, design a $CO_2$ injection system, design a hydraulic fracturing system, and the like.

As the MEM is created or updated, operational parameters may adjust to fit the MEM. In other embodiments, the MEM may adjust other parameters based on the MEM and the needs of the system. For example, if the system is a $CO_2$ injection system instead of a drilling system, the system may adjust injection parameters. In some embodiments, the users may manually adjust the relevant parameters. In other embodiments, the system may automatically adjust the parameters based on the MEM and the system's target operation.

Examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray R disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

Technical effects of the disclosed embodiments enable a determination of both the shear modulus (G) via a plurality of inflated packers and corresponding measurements. Thus, the shear modulus (G) may be determined based on measurements acquired on-site at a wireline formation tester (WFT) tool in a borehole in a relatively short amount of time, rather than a delayed result obtained from rock samples taken offsite for determination of the shear modulus (G). Accordingly, the shear modulus (G) may be determined in real-time via calculations utilizing measurements of various parameters associated with the inflation of multiple packers in a formation. The disclosed embodiments enable relatively fast determination of the shear modulus (G) compared to conventional techniques of rock sample analyses, thereby helping to improve the efficiency of oil and gas operations at a wellsite.

The subject matter described in detail above may be defined by one or more clauses, as set forth below.

A method including deploying a formation testing tool in a borehole, actuating first and second packers of the formation testing tool in the borehole, obtaining measurements in response to actuation of the first and second packers of the formation testing tool in the borehole, and analyzing the measurements to estimate at least a shear modulus (G) of a geological formation surrounding the borehole.

The method of the preceding clause, wherein actuating includes supplying a fluid to the first and second packers to cause the actuation of the first and second packers from a contracted state to an expanded state applying pressure against a borehole wall of the borehole.

The method of any preceding clause, wherein obtaining measurements includes measuring a pressure and a fluid volume in response to the actuation of the first and second packers.

The method of any preceding clause, wherein obtaining measurements includes measuring a stiffness of material surrounding the borehole based on a slope of a curve representing the pressure versus the fluid volume over a duration of the actuation of the first and second packers.

The method of any preceding clause, wherein the stiffness represents a harmonically averaged value of a first stiffness surrounding the first packer and a second stiffness surrounding the second packer.

The method of any preceding clause, wherein deploying includes deploying the formation testing tool to a first position having the first and second packers within a casing of the borehole, obtaining measurements comprises obtaining first measurements in response to actuation of the first and second packers of the formation testing tool in the casing within the borehole, wherein the method further includes processing the first measurements to obtain a stiffness measurement in the casing as a function of the first measurements, and calculating a system stiffness as a function of the stiffness measurement in the casing and a known casing stiffness of the casing.

The method of any preceding clause, wherein deploying includes deploying the formation testing tool to a second position having the first packer within the casing of the borehole and the second packer within a first formation of the borehole, obtaining measurements comprises obtaining second measurements in response to actuation of the first packer in the casing and the second packer in the first formation, wherein the method further includes processing the second measurements to obtain a first stiffness measurement as a function of the second measurements, and calculating a first formation stiffness of the first formation as a function of the first stiffness measurement, the known casing stiffness of the casing, and the system stiffness.

The method of the preceding clause, wherein deploying includes deploying the formation testing tool to a third position having the first packer within the first formation of the borehole and the second packer with a second formation of the borehole, obtaining measurements comprises obtaining third measurements in response to actuation of the first packer in the first formation and the second packer in the second formation, wherein the method further includes processing the third measurements to obtain a second stiffness measurement as a function of the third measurements, and calculating a second formation stiffness of the second formation as a function of the second stiffness measurement, the first formation stiffness of the first formation, and the system stiffness.

The method of the preceding clause, including calibrating the formation testing tool at least based on a system stiffness of the formation testing tool.

The method of the preceding clause, wherein the first packer is disposed at a first position within a first material surrounding the borehole and the second packer is disposed at a second position within a second material surrounding the borehole, and the first and second materials are different from one another, wherein the method further comprises processing the measurements to obtain a stiffness measurement as a function of the measurements, and calculating a second stiffness of the second material as a function of the stiffness measurement, a first stiffness known for the first material, and a system stiffness known for the formation testing tool.

The method of any preceding clause, including processing the measurements to obtain a stiffness measurement as a function of the measurements, and calculating a second stiffness of the second material as a function of the stiffness measurement, a first stiffness known for the first material, and a system stiffness known for the formation testing tool.

The method of any preceding clause, including progressively moving the formation testing tool through the borehole in a plurality of testing stages, wherein each stage of the plurality of testing stages includes positioning the first packer in a first material of a first stiffness that is known and the second packer within a second material of a second stiffness that is unknown obtaining the measurements in response to actuation of the first packer within the first material and the second packer within the second material, wherein the measurements include pressure and volume during the actuation, processing the measurements to obtain a stiffness measurement as a function of the measurements, calculating the second stiffness of the second material as a function of the stiffness measurement, the first stiffness, and a system stiffness known for the formation testing tool, and calculating the shear modulus (G) for the second material as a function of the second stiffness.

The method of any preceding clause, including controlling movement of the formation testing tool through the borehole in the plurality of testing stages, controlling one or more valves and/or a pump of the formation testing tool to control actuation of the first and second packers of the formation testing tool in each stage of the plurality of stages, and monitoring sensors of the formation testing tool to obtain the measurements, wherein the sensors comprise a pressure sensor and a flow rate sensor coupled to a fluid circuit of the first and second packers.

The method of any preceding clause, including controlling one or more parameters of the formation testing tool and/or wellsite equipment based on the shear modulus (G), wherein analyzing the measurements to estimate at least the shear modulus (G) is performed in real-time upon obtaining the measurements.

The method of any preceding clause, including supplying a fluid to pressurize a volume axially between the first and second packers and radially between the formation testing tool and the borehole after actuating the first and second packers, and obtaining the measurements associated with the volume, wherein the measurements comprise a pressure and a fluid volume.

A tangible and non-transitory machine readable medium including instructions executable by one or more processors to perform operations including controlling deployment of a formation testing tool in a borehole, controlling actuation of first and second packers of the formation testing tool in the borehole, obtaining measurements in response to actuation of the first and second packers of the formation testing tool in the borehole, and analyzing the measurements to estimate at least a shear modulus (G) of a geological formation surrounding the borehole.

The medium of the preceding clause, wherein the operations further include processing the measurements to obtain a stiffness measurement as a function of the measurements, wherein the first and second packers are within different first and second materials surrounding the borehole, and calculating a second stiffness of the second material as a function of the stiffness measurement, a first stiffness known for the first formation, and a system stiffness known for the formation testing tool.

The medium of the preceding clause, wherein the operations further include calibrating the formation testing tool in a casing to obtain the system stiffness as a function of a casing stiffness measurement based on actuation of the first and second packers in the casing and a known casing stiffness of the casing.

A system including a formation testing tool configured to deploy in a borehole, wherein the formation testing tool includes a first packer, a second packer, a fluid supply configured to supply a fluid to cause an actuation of the first and second packers, at least one pressure sensor configured to monitor pressure during the actuation of the first and second packers, at least one fluid volume sensor configured to monitor a fluid volume during the actuation of the first and second packers, a controller having a memory, a processor, and instructions stored on the memory and executable by the processor to obtain measurements from the at least one pressure sensor and the at least one fluid volume sensor in response to the actuation of the first and second packers of the formation testing tool in the borehole, and analyze the measurements to estimate at least a shear modulus (G) of a geological formation surrounding the borehole.

The system of the preceding clause, wherein the controller is further configured to process the measurements to obtain a stiffness measurement as a function of the measurements, wherein the first and second packers are within different first and second materials surrounding the borehole, and calculate a second stiffness of the second material as a function of the stiffness measurement, a first stiffness known for the first formation, and a system stiffness known for the formation testing tool.

The system of any preceding clause, wherein the formation testing tool is configured to progressively move through the borehole in a plurality of testing stages, wherein each stage of the plurality of testing stages has the first packer within a first material of a first stiffness that is known and the second packer within a second material of a second stiffness that is unknown, wherein, for each stage of the plurality of testing stages, the controller is further configured to obtain the measurements in response to actuation of the first packer within the first material and the second packer within the second material, wherein the measurements include the pressure and the fluid volume during the actuation, process the measurements to obtain a stiffness measurement as a function of the measurements, calculate the second stiffness of the second material as a function of the stiffness measurement, the first stiffness, and a system stiffness known for the formation testing tool, and calculate the shear modulus (G) for the second material as a function of the second stiffness.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
    deploying a formation testing tool in a borehole;
    actuating first and second packers of the formation testing tool in the borehole;
    obtaining measurements in response to actuation of the first and second packers of the formation testing tool in the borehole;
    analyzing the measurements to estimate at least a shear modulus (G) of a geological formation surrounding the borehole; and
    controlling one or more parameters of at least one of the formation testing tool and wellsite equipment using the shear modulus (G), wherein analyzing the measurements to estimate at least the shear modulus (G) is performed in real-time upon obtaining the measurements, wherein the wellsite equipment comprises at least one of a drill string, a drill bit, or a bottom hole assembly (BHA), wherein the one or more parameters of the wellsite equipment comprise at least one of a composition of a drilling mud, a flow rate of the drilling mud, a rotational speed of a drill string, a rotational speed of a drill bit, a direction of drilling of the BHA, or a weight on the drill bit.

2. The method of claim 1, wherein actuating comprises supplying a fluid to the first and second packers to cause the actuation of the first and second packers from a contracted state to an expanded state applying pressure against a borehole wall of the borehole.

3. The method of claim 2, wherein obtaining measurements comprises measuring a pressure and a fluid volume in response to the actuation of the first and second packers.

4. The method of claim 3, wherein obtaining measurements comprises measuring a stiffness of material surrounding the borehole based on a slope of a curve representing the pressure versus the fluid volume over a duration of the actuation of the first and second packers.

5. The method of claim 4, wherein the stiffness represents a harmonically averaged value of a first stiffness surrounding the first packer and a second stiffness surrounding the second packer.

6. The method of claim 1, wherein:

deploying comprises deploying the formation testing tool to a first position having the first and second packers within a casing of the borehole;

obtaining measurements comprises obtaining first measurements in response to actuation of the first and second packers of the formation testing tool in the casing within the borehole, wherein the method further comprises:

processing the first measurements to obtain a stiffness measurement in the casing as a function of the first measurements; and calculating a system stiffness as a function of the stiffness measurement in the casing and a known stiffness of the casing.

7. The method of claim 6, wherein:

deploying comprises further deploying the formation testing tool to a second position having the first packer within the casing of the borehole and the second packer within a first formation of the borehole;

obtaining measurements comprises obtaining second measurements in response to actuation of the first packer in the casing and the second packer in the first formation, wherein the method further comprises:

processing the second measurements to obtain a first stiffness measurement as a function of the second measurements; and calculating a first formation stiffness of the first formation as a function of the first stiffness measurement, the known casing stiffness of the casing, and the system stiffness.

8. The method of claim 7, wherein:

deploying comprises further deploying the formation testing tool to a third position having the first packer within the first formation of the borehole and the second packer within a second formation of the borehole;

obtaining measurements comprises obtaining third measurements in response to actuation of the first packer in the first formation and the second packer in the second formation, wherein the method further comprises:

processing the third measurements to obtain a second stiffness measurement as a function of the third measurements; and calculating a second formation stiffness of the second formation as a function of the second stiffness measurement, the first formation stiffness of the first formation, and the system stiffness.

9. The method of claim 1, comprising calibrating the formation testing tool at least based on a system stiffness of the formation testing tool.

10. The method of claim 1, wherein the first packer is disposed at a first position within a first material surrounding the borehole and the second packer is disposed at a second position within a second material surrounding the borehole, and the first and second materials are different from one another, wherein the method further comprises:

processing the measurements to obtain a stiffness measurement as a function of the measurements; and calculating a second stiffness of the second material as a function of the stiffness measurement, a first stiffness known for the first material, and a system stiffness known for the formation testing tool.

11. The method of claim 1, comprising progressively moving the formation testing tool through the borehole in a plurality of testing stages, wherein each stage of the plurality of testing stages comprises:

positioning the first packer in a first material of a first stiffness that is known and the second packer within a second material of a second stiffness that is unknown;

obtaining the measurements in response to actuation of the first packer within the first material and the second packer within the second material, wherein the measurements include pressure and volume during the actuation;

processing the measurements to obtain a stiffness measurement as a function of the measurements;

calculating the second stiffness of the second material as a function of the stiffness measurement, the first stiffness, and a system stiffness known for the formation testing tool; and calculating the shear modulus (G) for the second material as a function of the second stiffness.

12. The method of claim 11, comprising controlling movement of the formation testing tool through the borehole in the plurality of testing stages, controlling one or more valves and/or a pump of the formation testing tool to control actuation of the first and second packers of the formation testing tool in each stage of the plurality of stages, and monitoring sensors of the formation testing tool to obtain the measurements, wherein the sensors comprise a pressure sensor and a flow rate sensor coupled to a fluid circuit of the first and second packers.

13. The method of claim 1, comprising:

supplying a fluid to pressurize a volume axially between the first and second packers and radially between the formation testing tool and the borehole after actuating the first and second packers; and obtaining the measurements associated with the volume, wherein the measurements comprise a pressure and a fluid volume.

14. The method of claim 1, further comprising updating a model based on the shear modulus (G) of the geological formation.

15. A tangible and non-transitory machine readable medium comprising instructions executable by one or more processors to perform operations comprising:

controlling deployment of a formation testing tool in a borehole;

controlling actuation of first and second packers of the formation testing tool in the borehole;

obtaining measurements in response to actuation of the first and second packers of the formation testing tool in the borehole;

analyzing the measurements to estimate at least a shear modulus (G) of a geological formation surrounding the borehole; and controlling one or more parameters of at least one of the formation testing tool and wellsite equipment using the shear modulus (G), wherein analyzing the measurements to estimate at least the shear modulus (G) is performed in real-time upon obtaining the measurements, wherein the wellsite equipment comprises at least one of a drill string, a drill bit, or a bottom hole assembly (BHA), wherein the one or more parameters of the wellsite equipment comprise at least one of a composition of a drilling mud, a flow rate of the drilling mud, a rotational speed of a drill string, a rotational speed of a drill bit, a direction of drilling of the BHA, or a weight on the drill bit.

16. The medium of claim 15, wherein the operations further comprise:

processing the measurements to obtain a stiffness measurement as a function of the measurements, wherein the first and second packers are within different first and second materials surrounding the borehole; and calculating a second stiffness of the second material as a function of the stiffness measurement, a first stiffness known for the first material, and a system stiffness known for the formation testing tool.

17. The medium of claim 16, wherein the operations further comprise:

calibrating the formation testing tool in a casing to obtain the system stiffness as a function of a casing stiffness measurement based on actuation of the first and second packers in the casing and a known casing stiffness of the casing.

18. A system, comprising:

a formation testing tool configured to deploy in a borehole, wherein the formation testing tool comprises:

a first packer;

a second packer;

a fluid supply configured to supply a fluid to cause an actuation of the first and second packers;

at least one pressure sensor configured to monitor pressure during the actuation of the first and second packers;

at least one fluid volume sensor configured to monitor a fluid volume during the actuation of the first and second packers;

a controller having a memory, a processor, and instructions stored on the memory and executable by the processor to:

obtain measurements from the at least one pressure sensor and the at least one fluid volume sensor in response to the actuation of the first and second packers of the formation testing tool in the borehole; and analyze the measurements to estimate at least a shear modulus (G) of a geological formation surrounding the borehole; and control one or more parameters of at least one of the formation testing tool and wellsite equipment using the shear modulus (G), wherein analyzing the measurements to estimate at least the shear modulus (G) is performed in real-time upon obtaining the measurements, wherein the wellsite equipment comprises at least one of a drill string, a drill bit, or a bottom hole assembly (BHA), wherein the one or more parameters of the wellsite equipment comprise at least one of a composition of a drilling mud, a flow rate of the drilling mud, a rotational speed of a drill string, a rotational speed of a drill bit, a direction of drilling of the BHA, or a weight on the drill bit.

19. The system of claim 18, wherein the controller is further configured to:

process the measurements to obtain a stiffness measurement as a function of the measurements, wherein the first and second packers are within different first and second materials surrounding the borehole; and calculate a second stiffness of the second material as a function of the stiffness measurement, a first stiffness known for the first material, and a system stiffness known for the formation testing tool.

20. The system of claim 18, wherein the formation testing tool is configured to progressively move through the borehole in a plurality of testing stages, wherein each stage of the plurality of testing stages has the first packer within a first material of a first stiffness that is known and the second packer within a second material of a second stiffness that is unknown, wherein, for each stage of the plurality of testing stages, the controller is further configured to:

obtain the measurements in response to actuation of the first packer within the first material and the second packer within the second material, wherein the measurements include the pressure and the fluid volume during the actuation;

process the measurements to obtain a stiffness measurement as a function of the measurements;

calculate the second stiffness of the second material as a function of the stiffness measurement, the first stiffness, and a system stiffness known for the formation testing tool; and calculate the shear modulus (G) for the second material as a function of the second stiffness.

* * * * *